United States Patent [19]

Yates, III: John B. et al.

[11] Patent Number: 5,237,006
[45] Date of Patent: Aug. 17, 1993

[54] THERMOPLASTIC RESIN COMPOSITIONS CONTAINING POLYPHENYLENE ETHERS AND POLYESTERS

[75] Inventors: Yates, III: John B., Glenmont; Alexandros Hasson, Feura Bush, both of N.Y.

[73] Assignee: General Electric Company, Pittsfield, Mass.

[21] Appl. No.: 590,199

[22] Filed: Sep. 28, 1990

[51] Int. Cl.⁵ .................. C08L 67/02; C08L 71/12
[52] U.S. Cl. .................................... 525/92; 525/396; 525/397; 525/905
[58] Field of Search ................ 525/92, 396, 397, 905

[56] References Cited

U.S. PATENT DOCUMENTS

| | | | |
|---|---|---|---|
| 3,639,517 | 2/1972 | Kitchen et al. | 525/153 |
| 4,283,503 | 8/1991 | Wright | 525/89 |
| 4,647,621 | 3/1987 | Pohrt et al. | 525/905 |
| 4,716,199 | 12/1987 | van der Meer | 525/92 |
| 4,732,937 | 3/1988 | Sybert | 525/92 |
| 5,010,144 | 4/1991 | Phanstiel, IV et al. | 525/905 |
| 5,041,504 | 8/1991 | Brown et al. | 525/396 |
| 5,089,566 | 2/1992 | Brown | 525/396 |

FOREIGN PATENT DOCUMENTS 0347828  12/1989  European Pat. Off. .

*Primary Examiner*—James J. Seidleck
*Assistant Examiner*—Thomas Hamilton, III

[57] ABSTRACT

Improved thermoplastic compositions are disclosed, comprising a polyethylene ether resin capped with an epoxytriazine compound; a thermoplastic polyester; and a radial block copolymer which itself comprises at least about 60% by weight of a polymerized vinyl aromatic material, and about 5%–40% of a polymerized conjugated diene monomer.

25 Claims, No Drawings

THERMOPLASTIC RESIN COMPOSITIONS CONTAINING POLYPHENYLENE ETHERS AND POLYESTERS

This invention relates generally to thermoplastic compositions, and more specifically to those which contain polyphenylene ether and polyester resins.

Polyphenylene ether resin (also known as polyphenylene oxide or "PPE") has become widely accepted in the plastics industry because of its desirable physical and chemical properties, such as high heat resistance and dimensional stability.

For end use applications which require greater resistance to chemicals such as non-polar solvents, PPE resins are sometimes combined with high crystallinity resins. Examples of the crystalline materials are thermoplastic polyesters, such as the family of poly(alkylene dicarboxylates).

However, PPE is somewhat incompatible with some of these resins, such as the above-mentioned polyesters, thereby leading to phase separation and delamination when these materials are combined. Parts molded from these blends are sometimes characterized by very low impact strength, along with a laminated appearance.

Continued research has resulted in several methods for compatibilizing PPE and polyesters. For example, U.S. Pat. No. 4,806,297 of S. B. Brown and J. B. Yates, III, discloses the incorporation of a polycarbonate-based material into such a blend to increase its overall compatibility. As another example, S. B. Brown teaches the capping of PPE with various epoxytriazine compounds, which also results in a desirable increase in compatibility with polyesters, as described in U.S. Ser. No. 351,905, filed on May 15, 1989, now U.S. Pat. No. 5,096,979.

The compatibilized PPE/polyester materials are very useful for preparing molded parts which must exhibit a high level of impact strength, flexibility, and resistance to solvents such as gasoline. Examples of such parts are housings and other components used to make lawn-care equipment; as well as automotive parts, e.g., doors and fenders.

Various molding techniques can be used to form such parts, although injection molding appears to be the most popular technique at the present time. Since almost all of the molding methods involve transfer of the polymer blend in molten form, the melt flow characteristics of the blend are extremely important.

Melt flow in blends of PPE and thermoplastic polyesters is sometimes improved by the additions of vinyl aromatic polymers such as homopolystyrene and rubber-modified polystyrene. However, these types of materials may not always provide the level of melt flow improvement required for high-speed, high-pressure processing operations, such as some of the injection molding processes. Furthermore, the use of certain vinyl aromatic materials results in other deficiencies in parts molded from these blends, such as undesirably large decreases in heat distortion temperature, or poor impact strength at low temperatures.

It is therefore apparent that a need exists for a compatible PPE-polyester blend which provides excellent melt flow characteristics while substantially maintaining other important properties, such as chemical resistance, tensile strength, and impact strength, both at room temperature and at very low temperatures.

SUMMARY OF THE INVENTION

The requirements addressed above have been satisfied by the discovery of the present invention, a primary embodiment of which is a thermoplastic composition comprising:

a) polyphenylene ether capped with an epoxytriazine compound;

b) thermoplastic polyester; and c) a radial block copolymer which comprises about 60% to about 95% by weight polymerized vinyl aromatic material, and about 40% to about 5% by weight polymerized conjugated diene monomer, wherein the copolymer has at least three polymer chains which form the radial configuration, each chain terminating with a substantially non-elastomeric segment.

The composition may further include elastomeric materials such as di- or tri-block copolymers or radial teleblock copolymers.

The description which follows provides further elaboration of the present invention.

DETAILED DESCRIPTION OF THE INVENTION

The PPE resins suitable for preparation of component (a) of the present invention are generally known in the art. Many of them are described in U.S. Pat. Nos. 3,306,874; 3,306,875; and 3,432,469 of Allan Hay; U.S. Pat. Nos. 3,257,357 and 3,257,358 of Gelu Stamatoff; U.S. Pat. No. 4,806,602 of Dwain M. White et al.; and U.S. Pat. No. 4,806,297 of Sterling B. Brown et al., all incorporated herein by reference. Both homopolymer and copolymer polyphenylene ethers are within the scope of this invention.

The preferred PPE resins are homo- and copolymers which comprise a plurality of structural units of the formula

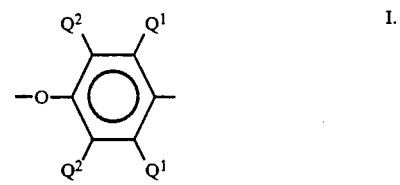

wherein each $Q^1$ is independently halogen, primary or secondary lower alkyl, phenyl, haloalkyl, aminoalkyl, hydrocarbonoxy, or halohydro-carbonoxy, wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl, and the corresponding heptyl groups. Examples of secondary lower alkyl groups are isopropyl, sec-butyl and 3-pentyl. Preferably, any alkyl radicals are straight chain, rather than branched. Most often, each $Q^1$ is alkyl or phenyl, especially $C_{1-4}$ alkyl, and each $Q^2$ is hydrogen.

Especially preferred polyphenylene ethers will be comprised of units derived from 2,6-dimethyl phenol. Also preferred in some instances are PPE copolymers comprised of units derived from 2,6-dimethyl phenol and 2,3,6-trimethyl phenol.

This invention also includes within its scope PPE resins which contain certain moieties which modify properties such as molecular weight, melt viscosity, or impact strength. For example, vinyl monomers and vinylaromatic compounds may be grafted onto the PPE polymer, as described, for example, in the application of Sterling B. Brown et al., U.S. Ser. No. 351,903, filed May 15, 1989 now U.S. Pat. No. 5,089,566, the entire contents of which are incorporated herein by reference.

As another example, coupled PPE polymers may also be used, in which the coupling agent is reacted with hydroxy groups of two PPE chains to produce a higher molecular weight polymer.

The PPE resins of this invention generally have a weight average molecular weight of about 20,000 to 80,000, as determined by gel permeation chromatography.

Furthermore, they can be prepared by methods known in the art: for example, oxidative coupling of an appropriate monohydroxyaromatic compound in the presence of a catalyst based on copper, manganese, or cobalt.

As mentioned above, the PPE polymer of this invention is capped (i.e., functionalized) with an epoxytriazine compound, as described in the application of Sterling. B. Brown et al., U.S. Ser. No. 351,905, now U.S. Pat. No. 5,096,979 filed May 15, 1989, the entire contents of which are incorporated herein by reference. This type of capped polymer contains end groups of the formula

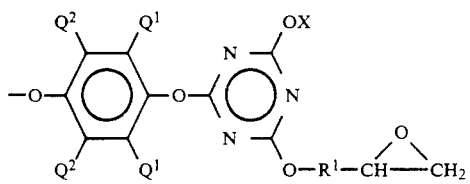

wherein $Q^1$ and $Q^2$ are described above, X is an alkyl, cycloalkyl, aromatic group, or

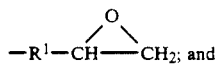

$R^1$ is a divalent aliphatic, alicyclic, heterocyclic, or substituted or unsubstituted aromatic hydrocarbon group.

The epoxytraizine-capped PPE materials may be prepared in solution by reacting at least one PPE polymer with a compound of the formula

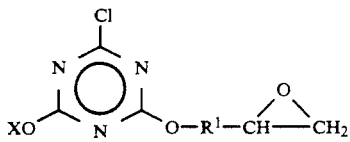

$R^1$ and X having been defined above.

The reaction can be carried out in the presence of a basic reagent such a pyridine.

Examples of epoxychlorotriazines conforming to Formula IV and suitable for this invention are the following:

2-chloro-4,6-diglycidoxy-1,3,5-triazine, also known as diglycidyl chlorocyanurate ("DGCC");

2-chloro-4-(n-butoxy)-6-glycidoxy-1,3,5-triazine, also known as n-butyl glycidyl chlorocyanurate ("BGCC"); and 2-chloro-4-(2,4,6-trimethylphenoxy)-6-glycidoxy-1,3,5-triazine, also known as mesityl glycidyl chlorocyanurate ("MGCC").

Suitable methods for the preparation of these epoxychlorotriazines are known in the art and described, for example in U.S. Pat. No. 4,895,945 of Sterling B. Brown et al., the contents of which are incorporated herein by reference. As an illustration, 2,4,6-trichlorotriazine may be reacted with glycidol or combinations of glycidol with n-butanol or mesitol.

Usually, about 1-20% by weight epoxychlorotriazine is used for capping, based on the amount of PPE employed. The basic reagent is present in an amount effective to promote the reaction, usually about 0.5 to 5 equivalents per mole of chloroepoxytriazine.

As an alternative to the solution method, an interfacial technique may be used to prepare the epoxychlorotriazine-capped PPE polymers, wherein the reaction is carried out in the presence of water, a water-soluble base such as sodium hydroxide, and a phase transfer catalyst such as a tetra-alkylammonium chloride compound. This technique is sometimes preferred because it results in a relatively low level of chemically-bound chlorine in the product.

The capped PPE polymers may be isolated by conventional techniques, such as precipitation with a nonsolvent.

As mentioned above, the composition of this invention includes at least one thermoplastic polyester. The choice of a particular thermoplastic polyester is not critical to this invention; many of them contain structural units of the formula

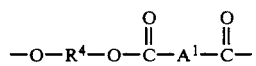

wherein each $R^4$ is independently a divalent aliphatic, alicyclic, aromatic hydrocarbon, or polyoxyalkylene group; and $A^1$ is a divalent aromatic group.

Examples of suitable polyesters containing the structures of Formula V are poly(alkylene dicarboxylates), elastomeric polyesters, polyarylates, and polyester copolymers such as copolyestercarbonates. Furthermore, it is sometimes desirable that the polyester has a relatively high carboxylic end group concentration, e.g., about 5-250 microequivalents per gram or, more preferably, about 20-70 microequivalents per gram.

Polyesters for the present invention sometimes include structural units of the formula

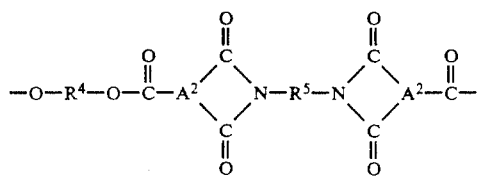

wherein $R^4$ is as previously defined, $R^5$ is a polyoxyalkylene group, and $A^2$ is a trivalent aromatic group.

The $A^1$ in Formula V is usually p- or m-phenylene, or a mixture thereof, and $A^2$ in Formula VI is usually derived from trimellitic acid, and has the structure

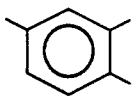
VII.

The poly(alkylene terephthalates) are often the preferred polyesters for the present invention, with poly-(ethylene terephthalate) (PET) and poly(butylene terephthalate)(PBT) being the most preferred members of this class. Mixtures of PET and PBT are also sometimes very suitable.

Examples of the polyalkylene terephthalates are also provided in the following U.S. Pat. Nos. 4,902,753; 4,128,526; 3,953,394; 3,671,487; 3,047,539; 2,822,348; 2,727,881; 2,720,502; and 2,465,319, the entire contents of all of these patents being incorporated herein by reference.

The polyester generally has a number-average molecular weight in the range of about 20,000 to 70,000, as determined by intrinsic viscosity at 30° C. in a mixture of 60% phenol and 40% 1,1,2,2-tetrachloroethane (by weight). Methods for the preparation of polyesters described herein are generally well known in the art.

The relative amounts of PPE and polyester used for this invention are not particularly critical; they are dictated mainly by the types of properties desired for the overall composition. Usually each polymer is employed at a level in the range of about 15% by weight to about 70% by weight, based on the weight of the entire composition. In preferred embodiments, the weight ratio of capped PPE polymer to thermoplastic polyester ranges from about 60:40 to about 20:80.

Various procedures may be employed to mix the capped PPE resin with the thermoplastic polyester, as described below. Solution or melt-blending techniques are usually used. Reaction temperatures are in the range of about 175°–350° C.

The blending of the capped PPE and the polyester under reactive conditions results in the formation of some PPE-polyester copolymer, which is within the scope of the present invention. Any copolymer formation resulting from this blending is referred to as "PPE-polyester copolymer". Thus, the compositions of this invention can include PPE-polyester copolymer, as well as various proportions of PPE and polyester homopolymers.

An additional component of the present invention is a vinyl aromatic-based radial block copolymer. Copolymers of this type which are suitable for the present invention comprise about 60% to about 95% by weight polymerized vinyl aromatic material, and about 40% to about 5% by weight polymerized conjugated diene monomer. The copolymer has at least three polymer chains which form the radial configuration. Each chain usually terminates with a substantially non-elastomeric segment, to which an elastomeric polymer segment is joined. They are sometimes referred to as "polymodal branched block copolymers".

Because of their relatively low rubber content, these types of radial block copolymers do not primarily function as impact modifiers in the compositions described herein. Instead, they function as additives which, surprisingly, enhance melt flow without substantially detracting from the excellent low temperature impact strength and ductility provided for by the overall polymer system.

Some examples of radial block copolymers which are suitable for the present invention are described in U.S. Pat. No. 3,639,517 of A. G. Kitchen et al, the contents of which are incorporated herein by reference. The copolymers are sometimes referred to as rigid "star polymers", as described by A. Noshay and J. McGrath in *Block Copolymers—Overview and Critical Survey*, Academic Press, Inc. (1977). Commercial examples of these materials are marketed under the tradename "K-Resin ®" by Phillips Petroleum, e.g., grades KR01, KR03, KR04, KR05, and KR10. The radial block copolymers usually have a melt flow in the range of about 0.5 to about 20, as determined by ASTM D-1238-65T, condition G, as referenced in U.S. Pat. No. 3,639,517. K-Resins are also described in *K-Resin ® BDS Polymer: A New Clear Impact Resistant Polystyrene*, L. M. Fodor, A. G. Kitchen, C. C. Biard, Am. Chem. Soc., Div. Org. Coat. Plast. Chem., Preprints, 34(1), 130 (1974).

In preferred embodiments, the radial block copolymer comprises about 60% to about 95% by weight polymerized vinyl aromatic material, and about 40% to about 5% polymerized conjugated diene monomer. In more preferred embodiments, the copolymer comprises about 70% to about 95% by weight polymerized vinyl aromatic material, and about 30% to about 5% polymerized conjugated diene monomer.

The polymerized vinyl aromatic material for the radial copolymer is usually derived from a monomer selected from the group consisting of styrene, chlorostyrene, vinyl toluene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, 1-vinylnaphthalene, 2-vinylnaphthalene, mixtures of any of these monomers, and copolymers formed from any combination of these monomers.

In preferred embodiments, the vinyl aromatic material is one derived from either homostyrene, para-methylstyrene, or t-butylstyrene, with homostyrene (i.e., as polymerized into homopolystyrene) being most preferred for many embodiments.

The polymerized conjugated diene monomer is usually derived from one or more of the following monomers: 1,3-butadiene, isoprene, 2,3-dimethyl-1,3-butadiene, piperylene, 3-butyl-1,3-octadiene, and phenyl-1,3-butadiene. Of this group, 1,3-butadiene, isoprene, or mixtures of these two are preferred, with 1,3-butadiene itself being most preferred.

The amount of radial block copolymer present in the composition depends on at least several variables, such as the particular vinyl aromatic and diene materials employed, as well as the level of low-temperature impact strength and ductility desired for an article formed from these compositions. Usually, about 1% by weight to about 30% by weight radial block copolymer is present, based on the weight of the entire composition. In more preferred embodiments, about 5% by weight to about 15% by weight is present.

Methods for preparing the radial block copolymers are familiar to those skilled in the art, and are also described in some of the references mentioned herein, such as U.S. Pat. No. 3,639,517. Often, a sequential polymerization of the vinyl aromatic material and the conjugated diene monomer is carried out. Multiple additions of the vinyl aromatic material in the presence of an initiator produce the non-elastomeric segments, followed by the addition and polymerization of the diene to form the elastomeric block. A treating agent, having at least two functional groups (preferably three groups) attached thereto, is then added to form branching, i.e., the chain formation which characterizes these radial block copolymers. A suitable example of such a treating agent is a polyepoxide compound. Polymerization is usually carried out at temperatures of less than about 250° F. (121° C.), and recovery of the polymer can be accomplished by several appropriate techniques, such as solvent precipitation.

No special procedures are required for incorporating the radial block copolymer into the overall composition; dry-blending individually with the functionalized PPE or with the polyester is possible, as is the addition of the radial block copolymer to a pre-blend of the PPE and polyester.

In some instances, compositions of the present invention may include at least one elastomeric material, such as a linear elastomeric block copolymer, a radial teleblock copolymer, or mixtures of these materials. They are usually used at levels ranging from about 1% by weight to about 30% by weight, based on the weight of the entire composition, and more preferably, from about 5% by weight to about 15% by weight.

Some of the suitable linear elastomeric block copolymers are characterized by an A-B, A-B-A', or $(A-B)_m$-X structure, or mixtures of these structures, wherein A and A' are each polymerized vinyl aromatic hydrocarbon blocks, each B is derived from at least one polymerized conjugated diene, X is the radical of a multifunctional coupling agent, and m is an integer of at least 2. These types of materials are well-known in the art, and frequently comprise blocks of polystyrene and polybutadiene. The polybutadiene may be completely-, partially-, or non-hydrogenated. Some examples of suitable block copolymers are provided in U.K. Patent No. 1,264,741, and in U.S. Pat. Nos. 3,078,254; 3,149,182; 3,231,635; 3,265,765; 3,287,333; 3,297,793; 3,462,162; 3,594,452; 3,595,942; 3,694,523; 3,842,029; 4,402,159; 4,935,472, and 4,755,566; 4,900,786; all incorporated herein by reference.

The radial teleblock copolymers which may be used as elastomers for these compositions contain segments or "blocks" which themselves comprise a conjugated diene polymer, vinyl aromatic polymer blocks, and a coupling agent. These materials are sometimes referred to as "branched" polymers, and are known in the art. For example, they are generally described in U.S. Pat. No. 4,097,550; ADHESIVES AGE, Marrs et al, December, 1971, pp. 15-20; and in RUBBER WORLD, Haws et al, January, 1973, pp. 27-32, the patent and other disclosures being incorporated herein by reference. They are also generally described in U.S. Ser. No. 07-591193 of John B. Yates, filed on Sep. 28, 1990, and assigned to the assignee of the present invention.

Usually, several chains of the diene polymer (often three or more) extend from a coupling agent, with each chain terminating at its other end with a block of the vinyl aromatic polymer.

Examples of conjugated dienes which may be used to form the radial teleblock copolymer are 1,3-butadiene; isoprene; 2,3-dimethyl-1,3-butadiene; 1,3-pentadiene; 3-butyl-1,3-octadiene; and mixtures of these dienes, with 1,3-butadiene being most preferred.

The vinyl aromatic polymer for the radial teleblock copolymer is usually prepared from compounds such as those designated by Formula I (Column 2) of U.S. Pat. No. 4,097,550, mentioned above. Examples of such compounds are styrene, chlorostyrene, vinyl toluene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, 1-vinylnaphthalene, 2-vinylnaphthalene, as well as other alkyl, cycloalkyl, aryl, alkaryl, and aralkyl derivatives of any of these compounds. Furthermore, mixtures and/or copolymers of any of these compounds may be used to form the vinyl aromatic polymer.

The molecular weight of the radial teleblock copolymer is not especially critical, and preferably ranges from about 100,000 to about 350,000. It also preferably comprises from about 1 to about 50 parts by weight vinyl aromatic compound, and from about 99 to about 50 parts by weight conjugated diene, based on the weight of the entire teleblock copolymer. Various factors are to be considered in selecting an appropriate amount of coupling agent, such as the type of agent used, and the amount of organometallic initiator employed (the latter mentioned further below). Usually, relatively small amounts of coupling agent are preferred, for example, from about 0.1 to 1.0 parts by weight per 100 parts of resin.

Radial teleblock copolymers are available commercially. They can also be prepared by techniques known in the art. For example, they can be made by polymerizing conjugated dienes (e.g., butadiene) and vinyl aromatic compounds, e.g., styrene, in the presence of an organometallic initiator such as n-butyllithium, thereby producing copolymers which contain an active metal atom such as lithium on one end of each of the polymer chains. These metal atom-terminated polymers can then be reacted with a coupling agent which has at least three active sites capable of reacting with the carbon-metal atom bonds on the polymer chains, and replacing the metal atoms on the chains. This results in polymers which have relatively long branches which radiate from a nucleus formed by the polyfunctional coupling agent. The teachings of U.S. Pat. No. 3,281,383, issued to Zelinski et al and incorporated herein by reference, describe such a method of preparation.

The coupling agents for the radial teleblock copolymers can be chosen from among polyepoxides, polyisocyantes, polyimines, polaldehydes, polyketones, polyanhydrides, polyesters, polyhalides, and the like. The materials can contain two or more types of functional groups, such as the combination of epoxy and aldehye groups, or isocyante and halide groups, as also described in the above-referenced Zelinski et al patent.

Some preferred embodiments of this invention call for a radial teleblock of styrene and butadiene, with terminal blocks derived from styrene, and a coupling agent selected from epoxidized polybutadiene, $SiCl_4$, or mixtures thereof. Examples of preferred epoxidized polybutadiene coupling agents are those designated commercially as Oxiron 2000 and Oxiron 2001.

Sometimes, the radial teleblock copolymers can be "extended" or diluted with mineral oil; e.g., light mineral oil. These extenders can comprise up to about 60% by weight of the copolymer.

Commercial examples of suitable radial teleblock copolymers are the FINAPRENE products, Grades 401, 411, 414, 416, and 417, available from Fina Oil Company.

The compositions of this invention may also include one or ore additives which impart or enhance a variety of characteristics which are sometimes desirable. Examples of such additives are flame retardants, plasticizers, stabilizers (e.g., heat-stabilizers and ultraviolet light stabilizers), antistatic agents, fillers, reinforcing agents, lubricants, colorants, dyes, pigments, and drip retardants. These additives are of course used in effective amounts, which usually range, for each, from about 0.1% by weight of about 50% by weight, based on the weight of the entire composition.

Preparation of the compositions described herein can be achieved by conventional procedures. For example, the ingredients can be combined by any technique which results in an intimate blend. These techniques often involve the use of an extruder, which provides a substantial shearing force to the composition. Extruders which permit the addition of all of the ingredients through one port may be employed, or alternatively, those which contain multiple ports may be used. For example, the capped PPE, radial block copolymer, any other ingredients, and a portion of the polyester may be added through the upstream port of a suitable extruder, while the remaining portion of the polyester is added through a downstream port. The extruder is sometimes vacuum-vented. Extrusion temperatures can be determined without undue experimentation by those skilled in processing thermoplastics. They are usually in the range of about 240° C. to about 320° C.

As mentioned above, the compositions of the present invention surprisingly exhibit an unusual combination of properties in melt form and in the form of molded articles. Some of these properties are high melt flow, excellent chemical resistance and tensile strength, and high impact strength, both at room temperature and at much lower temperatures. The examples which follow illustrate the characteristics of the present invention.

EXAMPLES

The following materials were used in these examples:

CAPPED PPE—The base resin was poly(2,6-dimethyl-1,4-phenylene ether), having an intrinsic viscosity in chloroform at 25° C. of 0.40 dl./gram. Four percent (4%) by weight of an epoxytriazine compound of Formula IV (percentage expressed as a percentage of the PPE) was dissolved in pyridine and then added to a solution of the PPE and toluene, with stirring. The solution was heated for 0.5 hours, after which the products were precipitated with methanol, filtered, washed with methanol, and then dried.

POLYESTER—The polyester employed was a poly(butylene terephthalate), having a weight average molecular weight of about 103,000, and a dispersity of about 1.9, as determined by gel permeation chromatography. The polyester had an acid end group number of about 50 microrams/g as determined by titration.

BLOCK COPOLYMER—A saturated styrene-butadiene-styrene linear block copolymer, having a styrene/rubber ratio of about 28:72, was used. The polystyrene end blocks each had a weight average molecular weight of about 9,500, while the butadiene midblock had a weight average molecular weight of about 47,000, for a total weight average molecular weight of 66,000.

HIGH IMPACT POLYSTYRENE—Butadiene-modified homopolystyrene, having a rubber content of about 10.5%.

RADIAL BLOCK COPOLYMER—K-Resin ®, grade KR-04, a styrene-butadiene copolymer commercially available from Phillips Petroleum Company, containing about 73% styrene and 27% butadiene.

STABILIZERS—The compositions also contained three antioxidants (sulfur-based, hindered phenol, and phosphite-based), each at a level of about 0.2–0.3 pbw, based on 100 pbw resin.

The amount of flow was measured in flow channel inches: the length of melt flow in a 0.250 inch×0.125 inch channel; with molding conditions of 525° F. cylinder (set), approximately 175° F., mold (set), and 10,000 psi injection pressure into mold.

The compositions for Example 1 were prepared by dry-blending and compounding the components, using a 30 mm Werner & Pfleiderer twin-screw extruder. The components are expressed in parts by weight (pbw), unless otherwise indicated.

The extrudate was quenched and pelletized, and the products were then molded on a Toshiba injection molding machine into various test specimens.

Tests on molded pieces resulted in the properties shown in Table 1:

TABLE 1

|  | Sample Number | | | |
|---|---|---|---|---|
|  | 1* | 2* | 3 | 4* |
| Capped PPE (pbw) | 30 | 20 | 20 | 20 |
| Polyester | 60 | 60 | 60 | 60 |
| Triblock Copolymer(a) | 10 | 10 | 10 | 10 |
| Rubber Modified Polystyrene (HIPS) | — | 10 | — | — |
| Homopolystyrene(b) | — | — | — | 10 |
| Radial Block Copolymer | — | — | 10 | — |
| PROPERTIES | | | | |
| Flow (Inches) | 20 | 21 | 24 | 23.5 |
| Izod Impact Strength (Notched)(ft-lb/in) | 15 | 16 | 18 | 3 |
| Dynatup Impact Strength(c) (Room Temp.)(ft-lbs) | 27D | 42D | 43D | 43D |
| Dynatup Impact Strength (−20° F.)(ft-lbs) | 47D | 4B | 50D | 8B |
| Flexural Modulus (Kpsi) | 288 | 284 | 255 | 300 |
| Flexural Strength (Kpsi) | 11.3 | 10.6 | 9.5 | 11.1 |
| Tensile Yield (Kpsi) | 7.3 | 6.9 | 6.3 | 7.3 |
| Tensile Elongation (%) (at break) | 41 | 43 | 75 | 41 |

(a)Styrene-Butadiene-Styrene Linear Block Copolymer
(b)Also known as "Crystal Polystyrene"
(c)"D" = Ductile, "B" = Brittle
* = Comparative Samples The data in Table 1 demonstrate that the use of the radial block copolymer of the present invention results in improved melt flow while various other important properties are maintained, such as low temperature impact strength and ductility.

EXAMPLE 2

The compositions set forth in Table 2 were prepared in the same manner as those in Example 1. Extrusion and molding procedures were also the same.

Tests on the molded pieces yielded the following results:

TABLE 2

|  | Sample Number | | |
|---|---|---|---|
|  | 5* | 6 | 7 |
| Capped PPE (pbw) | 30 | 20 | 30 |
| Polyester | 60 | 60 | 60 |
| Triblock Copolymer(a) | 10 | 10 | 10 |
| Radial Block Copolymer | — | 10 | 10 |
| PROPERTIES | | | |
| Flow (Inches) | 20.5 | 24 | 21 |
| Izod Impact Strength (Notched)(ft-lb/in) | 14 | 15 | 15 |
| Dynatup Impact Strength(b) (Room Temp.)(ft-lbs) | 39D | 46D | 43D |

TABLE 2-continued

| | Sample Number | | |
|---|---|---|---|
| | 5* | 6 | 7 |
| Dynatup Impact Strength (−20° F.)(ft-lbs) | 41D | 44D | 37D |
| Flexural Modulus (Kpsi) | 276 | 278 | 274 |
| Flexural Strength (Kpsi) | 10.7 | 10.2 | 10.2 |
| Tensile Yield (Kpsi) | 7.3 | 6.8 | 6.8 |
| Tensile Elongation (%) (at break) | 63 | 92 | 72 |

(a)Styrene-Butadiene-Styrene Linear Block Copolymer
(b)"D" = Ductile, "B" = Brittle
* = Comparative Sample The data in Table 2 again demonstrate that excellent impact strength and flow generally characterize compositions of the present invention, although there was a decreased in low temperature impact strength in sample 7, with the use of a larger proportion of capped PPE.

Table 2 also complements the data of Table 1 in demonstrating a beneficial increase in tensile elongation for compositions of the present invention.

It should of course be understood that this invention may be modified in various aspects related to composition ingredients and processing details, such modifications falling within the scope of the claims which follow.

All of the above-mentioned patents are incorporated herein by reference.

We claim:

1. A thermoplastic composition comprising:
   a) polyphenylene ether capped with an epoxytriazine compound;
   b) thermoplastic polyester; and
   c) a radial block copolymer which comprises about 60% to about 95% by weight polymerized vinyl aromatic material, and about 40% to about 5% by weight polymerized conjugated diene monomer, said copolymer having at least three polymer chains which form the radial configuration.

2. The composition of claim 1 wherein the polyphenylene ether comprises a plurality of structural units of the formula:

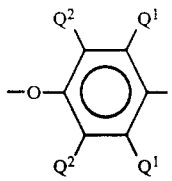

wherein each $Q^1$ is independently halogen, primary or secondary lower alkyl, phenyl, haloalkyl, aminoalkyl, hydrocarbonoxy, or halohydro-carbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. The composition of claim 2 wherein the polyphenylene ether is poly(2,6-dimethyl-1,4-phenylene ether).

4. The composition of claim 2 wherein the polyphenylene ether is derived from a monomer selected from the group consisting of 2,6-dimethyl phenol; 2,3,6-trimethyl phenol, and mixtures thereof.

5. The composition of claim 2 wherein the polyester comprises structural units of the formula

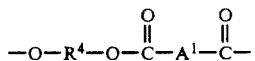

where each $R^4$ is independently a divalent aliphatic, alicyclic, or aromatic hydrocarbon group or polyoxyalkylene group, and $A^1$ is a divalent aromatic group.

6. The composition of claim 5 wherein the polyester is a poly(alkylene dicarboxylate), or mixtures of at least two poly(alkylene dicarboxylates).

7. The composition of claim 6 wherein the poly(alkylene dicarboxylate) is either poly(ethylene terephthalate), poly(butylene terephthalate), or mixtures thereof.

8. The composition of claim 5 wherein the polyester further comprises units of the formula

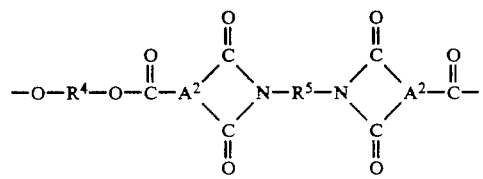

wherein $R^5$ is a polyoxyalkylene group, and $A^2$ is a trivalent aromatic group.

9. The composition of claim 1 wherein the capped polyphenylene ether is prepared by reacting at least one polyphenylene either polymer with an epoxytriazine compound of the formula

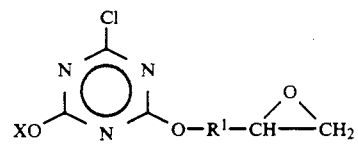

wherein $R^1$ is a divalent aliphatic, alicyclic, heterocyclic, or substituted or unsubstituted aromatic hydrocarbon group, and X is an alkyl, cycloalkyl, aromatic group, or

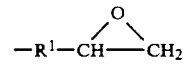

10. The composition of claim 9 wherein the epoxytriazine compound is selected from the group consisting of diglycidyl chlorocyanurate, n-butyl glycidyl chlorocyanurate, and mesityl glycidyl chlorocyanurate.

11. The composition of claim 1 wherein each polymer chain of the radial block copolymer terminates with a substantially non-elastomeric segment.

12. The composition of claim 1 wherein the radial block copolymer of compound (c) comprises about 70% to about 95% by weight polymerized vinyl aromatic material, and about 30% to about 5% by weight polymerized conjugated diene monomer.

13. The composition of claim 12 wherein the polymerized vinyl aromatic material is derived from a monomer selected from the group consisting of styrene, chlorostyrene, vinyl toluene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, 1-vinylnpahthalene, 2-vinylnaphthalene, and mixtures of any of these monomers.

14. The composition of claim 12 wherein the polymerized conjugated diene monomer is derived from the group consisting of 1,3-butadiene, isoprene, 2,3-dimethyl-1,3-butadiene, piperylene, 3-butyl-1,3-octadiene, phenyl-1,3-butadiene, and mixtures of any of the foregoing compounds.

15. The composition of claim 1, wherein the weight ratio of component (a) to component (b) ranges from about 60:40 to about 20:80.

16. The composition of claim 15 wherein the amount of radial block copolymer present ranges from about 1% by weight to about 30% by weight, based on the weight of the entire composition.

17. The composition of claim 16 wherein the amount of radial block copolymer present ranges from about 5% by weight to about 15% by weight, based on the weight of the entire composition.

18. The composition of claim 1, further comprising effective amounts of at least one additive selected from the group consisting of flame retardants, plasticizers, stabilizers, antistatic agents, fillers, reinforcing agents, lubricants, colorants, dyes, pigments, and drip retardants.

19. The composition of claim 17,
wherein said radial block copolymer comprises from about 70% to about 95% by weight polymerized vinyl aromatic material, and from about 30% to about 5% by weight non-hydrogenated polymerized conjugated diene monomer.

20. The composition of claim 19,
wherein said polymerized vinyl aromatic material comprises polystyrene, and said polymerized conjugated diene monomer comprises polybutadiene.

21. A thermoplastic composition comprising:

I) at least one copolymer of polyphenylene ether and thermoplastic polyester, and II) a radial block copolymer which itself comprises about 60% to about 95% by weight polymerized vinyl aromatic material, and about 40% to about 5% by weight polymerized conjugated diene monomer, said radial block copolymer having at least three polymer chains which form the radial configuration, each chain terminating with a substantially non-elastomeric segment, said polyphenylene either being capped with an epoxytriazine compound prior to reaction with said thermoplastic polyester.

22. The composition of claim 21, wherein the polyphenylene ether is derived from a monomer selected from the group consisting of 2,6-dimethyl phenol; 2,3,6-trimethyl phenol; and mixtures thereof; and wherein the polyester is selected from the group consisting of poly(alkylene dicarboxylates), elastomeric polyesters, polyarylates, polyester copolymers, and mixtures of any of these materials.

23. The composition of claim 22, wherein the poly(alkylene dicarboxylate) is selected from the group consisting of poly(ethylene terephthalate), poly(butylene terephthalate), and mixtures thereof.

24. The composition of claim 22, wherein the epoxytriazine compound is selected from the group consisting of diglycidyl chlorocyanurate, n-butyl glycidyl chlorocyanurate and mesityl glycidyl chlorocyanurate.

25. The composition of claim 22, wherein the polymerized vinyl aromatic material of component (II) is comprised substantially of polystyrene, and the polymerized conjugated diene monomer is comprised substantially of polybutadiene.

* * * * *